United States Patent [19]

Besecke et al.

[11] Patent Number: 5,395,898
[45] Date of Patent: Mar. 7, 1995

[54] N-ARYL-SUBSTITUTED POLY(METH)ACRYLIMIDES

[75] Inventors: Siegmund Besecke, Hameln; Andreas Deckers, Ludwigshafen; Harald Lauke, Mannheim, all of Germany

[73] Assignee: BASF Aktiengesellschaft, Ludwigshafen, Germany

[21] Appl. No.: 228,642

[22] Filed: Apr. 18, 1994

Related U.S. Application Data

[60] Division of Ser. No. 151,049, Nov. 12, 1993, which is a continuation of Ser. No. 994,631, Dec. 21, 1992, abandoned.

[30] Foreign Application Priority Data

Dec. 21, 1991 [DE] Germany ............... 41 42 572.3

[51] Int. Cl.[6] ............................................. C08F 8/32
[52] U.S. Cl. .................... 525/379; 525/330.5; 525/378; 526/265
[58] Field of Search ............... 525/379, 330.5

[56] References Cited

U.S. PATENT DOCUMENTS 4,954,575  9/1990  Sasaki ................. 525/330.5

*Primary Examiner*—Fred Zitomer
*Attorney, Agent, or Firm*—Keil & Weinkauf

[57] ABSTRACT

A polymer useful for preparing shaped articles comprises essentially repeat units of the formula I

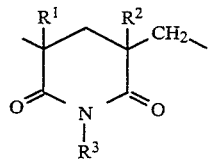

where $R^1$ and $R^2$ are each hydrogen or methyl, and
$R^3$ is $C_6$–$C_{14}$-aryl, which may be monosubstituted, disubstituted or trisubstituted by radicals selected from the group consisting of $C_1$–$C_4$-alkyl, $C_1$–$C_4$-alkoxy and halogen, and is obtainable by reacting a polymer based on $C_1$–$C_{20}$-alkyl esters of methacrylic acid or of acrylic acid or mixtures of such esters with an aromatic amine of the general formula II $R^3NH_2$   II in the presence of an amine having a $pK_b$ value $\leq 9$.

1 Claim, No Drawings

N-ARYL-SUBSTITUTED POLY(METH)ACRYLIMIDES

This is a divisional of application Ser. No. 08/151,049, filed Nov. 12, 1993, which is a continuation of Ser. No. 07/994,631, filed Dec. 21, 1992, now abandoned.

The present invention relates to a polymer comprising essentially repeat units of the formula I

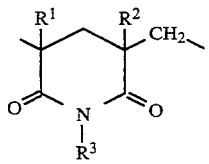

where
$R^1$ and $R^2$ are each hydrogen or methyl, and
$R^3$ is $C_6$–$C_{14}$-aryl, which may be monosubstituted, disubstituted or trisubstituted by radicals selected from the group consisting of $C_1$–$C_4$-alkyl, $C_1$–$C_4$-alkoxy and halogen,
obtainable by reacting a polymer based on $C_1$–$C_{20}$-alkyl esters of methacrylic acid or of acrylic acid or mixtures of such esters with an aromatic amine of the general formula II $$R^3NH_2 \qquad \text{II}$$

in the presence of an amine having a $pK_b$ value $\leq 9$.

The present invention further relates to a process for preparing these polymers, to their use for preparing shaped articles and to shaped articles from these polymers.

Polymers based on $C_1$–$C_{20}$-alkyl esters of (meth)acrylic acid, the most common representatives of which are methyl methacrylate and methyl acrylate, are notable for excellent transparence and weathering stability. For these reasons polymethyl methacrylates (PMMAs) are used for example for manufacturing optically demanding parts such as lenses and for lamp coverings.

However, there are a number of uses for which such acrylate molding materials are insufficiently heat distortion resistant. One of the possible solutions is to raise the glass transition temperature by polymer-analogous reaction of, for example, PMMA with primary amines (imidation) to form cyclic imide structures.

EP-B-234 726 describes a process for reacting methacrylic polymers with anhydrous amines in the presence of a solvent mixture (aromatic/alcohol) at up to 350° C., the amines claimed including aromatic ones. However, the low reactivity of aromatic amines necessitates very long reaction times and high temperatures. This in general results in highly discolored reaction products having a high yellowness index. Furthermore, under these conditions some of the primary amine is alkylated by the alcohol with the elimination of water. The freed water of reaction then hydrolyzes carboxylate groups and thus causes an undesirable increase in the acid number of the product.

U.S. Pat. No. 4,246,374 describes a process for reacting PMMA with anhydrous aromatic amines without a solvent on an extruder (melt process). In Examples 37 and 43 of this reference the aromatic amines employed are respectively aniline and tetrachloroaniline. In this process too the less reactive aromatic amines are less suitable for the imidization reaction than aliphatic amines (methylamine, cyclohexylamine). This is because the dramatic increase in the time of residence in the reaction zone represents an inefficient use of the extruder and results in a discolored product.

It is an object of the present invention to make available N-aryl-substituted polymethacrylamides having a reduced acid number and an improved yellowness index.

We have found that this object is achieved by the polymers defined at the beginning.

We have also found a process for preparing these polymers, a use for them in preparing shaped articles, and shaped articles that are obtainable from these polymers.

For the purposes of the present invention, polymers based on $C_1$–$C_{20}$-alkyl esters of (meth)acrylic acid include both homopolymers and copolymers, which copolymers may additionally contain other ethylenically unsaturated comonomers.

The preferred $C_1$–$C_{20}$-alkyl methacrylates are the $C_1$–$C_4$-alkyl esters such as methyl methacrylate (MMA), ethyl methacrylate, propyl methacrylate, n-butyl methacrylate, isobutyl methacrylate and tert-butyl methacrylate, of which methyl methacrylate is particularly preferred, and also mixtures thereof.

Preferred $C_1$–$C_{20}$-alkyl acrylates are the $C_1$–$C_4$-alkyl esters such as methyl acrylate (MA), ethyl acrylate, propyl acrylate, n-butyl acrylate, isobutyl acrylate and tert-butyl acrylate, of which methyl acrylate is particularly preferred, and also mixtures thereof.

Suitable ethylenically unsaturated comonomers are acrylic acid, methacrylic acid, maleic acid derivatives such as imides and $C_1$–$C_{10}$-alkyl esters, itaconic acid derivatives such as imides and $C_1$–$C_{10}$-alkyl esters, acrylonitrile, methacrylonitrile, styrene, α-methylstyrene, ethylene, propylene, butadiene and also mixtures thereof.

The polymers can be prepared in a single or multiple stage process, although in the case of a multiple stage polymerization at least the outer stage must contain groups that can be imidated.

In general, the polymers comprise more than 50, preferably more than 80% by weight of $C_1$–$C_{20}$-alkyl esters of methacrylic acid and acrylic acid. Of particular advantage from observations to date are polymers comprising from 80 to 100% by weight of methyl methacrylate and from 0 to 20% by weight of methyl acrylate within a weight average molecular weight range ($M_w$) of from 20,000 to 300,000 g/mol.

The primary amine used, $R^3NH_2$, is a $C_6$–$C_{14}$-arylamine, which may be monosubstituted, disubstituted or trisubstituted by $C_1$–$C_4$-alkyl, $C_1$–$C_4$-alkoxy or halogen such as fluorine, chlorine or bromine.

Examples are aniline, 2-, 3-, 4-methylaniline, 2,3-, 2,4-, 2,5-, 2,6-, 3,4-, 3,5-dimethylaniline, 2,6-diethylaniline, 2,4,6-trimethylaniline, 2-, 3-, 4-methoxyaniline, 2,4-, 2,5-, 3,4-, 3,5-dimethoxyaniline, 3,4,5-trimethoxyaniline, 2-, 3-, 4-chloroaniline, 2,3-, 2,4-, 2,5-, 2,6-, 3,4-, 3,5-dichloroaniline, 2-, 3-, 4-bromoaniline, 2,4-, 2,5-, 2,6-dibromoaniline, 2-, 3-, 4-fluoroaniline, 1-, 2-aminonaphthalene, 1-amino-2-methylnaphthalene, 2-amino-1-methylnaphthalene, 1-, 2-aminoanthracene, 9-aminophenanthrene, preferably aniline, 4-methoxyaniline, 1- and 2-aminonaphthalene.

To speed up the reaction it is possible to use from observations to date, any amine having a $pK_b$ value $\leq 9$, preferably a $pK_b$ value $\leq 6$. Examples are primary amines such as $C_1$-$C_{20}$-alkylamines, $C_5$-$C_{12}$-cycloalkylamines, secondary amines such as di-($C_1$-$C_{18}$-alkyl)amines and di-($C_5$-$C_8$-cycloalkyl)amines, for example diethylamine, dipropylamine, dibutylamine and dicyclohexylamine, and ammonia, preferably ammonia and primary amines such as cyclohexylamine. Particular preference is given to using primary amines having a boiling point of from 100° to 250° C. such as $C_7$-$C_{20}$-alkylamines, e.g. heptylamine, octylamine, decylamine, dodecylamine, stearylamine and eicosylamine, and $C_5$-$C_{12}$-cycloalkylamines such as cyclopentylamine, cyclohexylamine, cycloheptylamine, cyclooctylamine and cyclododecylamine.

The reaction is in general carried out by heating a mixture of acrylate polymer, aromatic amine and catalyst in a solvent to the boil in the absence of oxygen. Preferably, the alcohol formed in the course of the reaction, generally methanol, is distilled off continuously in order to suppress secondary reactions such as ether formation, amine alkylation and ester hydrolysis.

Toward the end of the reaction any excess amine may likewise be removed by distillation. After the reaction has ended, the polymer of the invention is in general isolated in a conventional manner, for example by precipitation, preferably in methanol, and subsequent drying. It is likewise possible for example to isolate the polymer of the invention by stripping the reaction mixture of low molecular weight concomitants such as solvent, amine and alcohol by treatment on a devolatilization extruder.

The reaction can also be carried out without solvent in the melt, but the embodiment in solution is preferred.

The aromatic amine can be present right from the start of the reaction as part of the initial charge or can be added for example continuously at the rate of its consumption.

The weight ratio of aromatic amine used to acrylate polymer is in general within the range from 100:1 to 0.1:1, preferably from 20:1 to 1:1.

The molar ratio of aromatic amine to catalyst is in general within the range from 2:1 to 1000:1, preferably from 5:1 to 100:1.

The solvent used can be basically any aprotic polar solvent such as

N,N'-disubstituted cyclic or acyclic carboxamides such as dimethylformamide, diethylformamide, dimethylacetamide or diethylacetamide N-methyl-2-pyrrolidone, N-ethyl-2-pyrrolidone N,N,N',N'-tetrasubstituted cyclic or acyclic ureas such as tetramethylurea N-substituted cyclic or acyclic (poly)amines such as dicyclohexylmethylamine, dimethylcyclohexylamine, N,N,N',N'-tetramethylethylenediamine or N,N,N',N'-tetramethylhexamethylenediamine high-boiling ethers such as ethylene glycol dimethyl ether and diethylene glycol dimethyl ether alkylene carbonates such as ethylene carbonate and propylene carbonate and other customary aprotic and polar solvents such as hexamethyl phosphoramide, nitroalkanes such as nitromethane, dimethyl sulfoxide, diphenyl sulfoxide and sulfolane, of which N-methylpyrrolidone is preferred.

The weight ratio of solvent used to polymer is in general within the range from 1:1 to 100:1, preferably from 1:1 to 10:1.

The reaction temperature is in general within the range from 50° to 350° C., preferably within the range from 150° to 250° C.

The protective gas atmosphere used in general comprises the customary inert gases such as nitrogen, argon, helium or carbon dioxide.

The reaction pressure is in general uncritical. The reaction is in general carried out within the range from 80 to 250 kPa, preferably under atmospheric pressure.

The choice of pH range is likewise uncritical and because of the amine used is in general above 7.

The reaction time is in general within the range from 0.01 to 100 h, preferably from 0.05 to 50 h.

Furthermore, the reaction may be further speeded up by adding known aminolysis catalysts in amounts within the range from 0.01 to 10% by weight, based on the polymer used. Examples are tertiary amines such as tricyclohexylamine substituted guanidines such as 1,1,3,3-tetramethylguanidine and 1,3-diphenylguanidine tetrasubstituted alkylammonium compounds such as trimethylstearylammonium chloride organic titanium compounds such as tetrapropoxytitanium and tetrabutoxytitanium organic tin compounds such as dibutyltin oxide and dibutyltin didodecanoate aromatic amines and imides such as quinoline, isoquinoline, 4-benzylpyridine, 4-phenylpyridine, 2-hydroxypyridine, 1,3-, 1,4- and 2,3-benzodiazine and 2,2'-, 2,3'- and 2,4'-bipyridyl imides such as N,N'-dicyclohexylcarbodiimide and also antimony trioxide, tin dioxide, sodium amide, sodium and potassium alkoxides such as sodium methoxide and potassium methoxide, ammonium chloride and ammonium iodide.

The N-aryl-substituted poly(meth)acrylimide of the invention can be processed in a conventional manner, for example by injection molding, extrusion or sintering, to prepare shaped articles.

The poly(meth)acrylimides and shaped articles of the invention have an acid number (free carboxyl and anhydride group content) of $\leq 0.5$ equivalent per kilogram of polymer. This ensures very good values in flowability, chemical resistance and stress cracking resistance.

By virtue of a transmissivity of $\geq 85\%$ and a yellowness index (as defined in DIN 5036) of $\leq 15$, the N-aryl-substituted poly(meth)acrylamides of the invention have good optical qualities.

The polymers of the invention can be used for preparing thermoplastically processible molding materials of high heat distortion resistance.

EXAMPLES

EXAMPLE 1

In a reaction vessel equipped with a packed column a mixture of 200 g of PMMA (comprising 99% by weight of MMA and 1% by weight of MA and having an average molecular weight ($M_w$) of 115 000 g/mol), 103 g (1.1 mol) of aniline, 10 g (0.1 mol) of cyclohexylamine and 600 g of N-methylpyrrolidone was heated to the boil under nitrogen. After about 30 min the entire polymer had dissolved and the internal temperature was 140° C. After a total reaction time of 90 min the methanol formed was continuously distilled out of the reaction mixture, and in the course of the rest of the reaction the internal temperature rose to 200° C. The polymethacrylimide formed was precipitated in methanol and then dried.

The results of the experiment are shown in Table 1.

EXAMPLES 2–8

By the procedure of Example 1 200 g of PMMA of the same composition as in Example 1 were reacted in each case with 1.2 mol of a mixture of aromatic amine and catalyst (see Table 2) and worked up as indicated above.

The precise quantities used and the results of the experiments are shown in Table 1.

EXAMPLE 9 (imidization in the melt)

On a twin-screw extruder (ZSK-40) with corotating, intermeshing screws, 10 kg/h of PMMA of the same composition as in Example 1 was continuously reacted at 270° C. with 5 kg/h of a mixture of 80 mol % of aniline and 20 mol % of cyclohexylamine. Downstream of the reaction zone the polymer melt was devolatilized on the same extruder and granulated.

The results of the experiment are shown in Table 1.

EXAMPLE 10 (comparative to Example 9)

Example 9 was repeated using pure aniline instead of the amine mixture.

The results of the experiment are shown in Table 1.

TABLE 1

Examples 1–10, imidization in solution and in the melt

| Ex. | ArNH$_2$ | (mol) | RNH$_2$ | (mol) | N content[1] (%) |
|---|---|---|---|---|---|
| 1 | aniline | (1.1) | cyclohexylamine | (0.1) | 3.8 |
| 2 | aniline | (1.0) | cyclohexylamine | (0.2) | 4.8 |
| 3 | aniline | (0.7) | cyclohexylamine | (0.5) | 5.4 |
| 4 (comp.) | aniline | (1.2) | — | (0.0) | 2.3 |
| 5 | 1-aminonaphthalene | (1.0) | cyclohexylamine | (0.2) | 3.1 |
| 6 (comp.) | 1-aminonaphthalene | (1.2) | — | (0.0) | 1.3 |
| 7 | 4-methoxyaniline | (1.0) | cyclohexylamine | (0.2) | 3.6 |
| 8 (comp.) | 4-methoxyaniline | (1.2) | — | (0.0) | 2.0 |
| 9 | aniline | (0.8) | cyclohexylamine | (0.2) | 3.2 |
| 10 (comp.) | aniline | (1.0) | — | (0.0) | 1.8 |

[1]N content from elemental analysis

EXAMPLES 11–13

By the procedure of Example 1 1.5 mol of respectively aniline, cyclohexylamine and a mixture of aniline and cyclohexylamine (1.2/0.3 mol) were reacted with 200 g of PMMA.

The results of the quality control tests are shown in Table 2.

The glass transition temperature $T_g$ of the polymers was determined by the DSC method (ASTM D 3418-82) on a DSC-30 instrument from Mettler.

The carboxyl and anhydride group content was determined titrimetrically. To this end 0.3 g of polymer was dissolved in 75 ml of 1:1 dichloromethane/methanol and admixed with an excess, based on the carboxyl and anhydride groups, of a measured volume of 0.1N sodium hydroxide solution. Then excess base was titrated with 0.1N hydrochloric acid to neutrality, the end point being determined potentiometrically.

The acid content was then determined from the difference, in equivalents, between the amount of base added and the amount of acid consumed, the acid value being corrected by subtracting the solvent blank (determined by carrying out the determination without polymer).

The acid number (AN) was then calculated as the acid content in equivalents per kilogram of imidizable polymer.

The $Y_i$ yellowness index was determined in accordance with DIN 6 167 on round disks ($\phi$=80 mm, d=6 mm).

The light transmissivity was measured in accordance with DIN 5 036 on 1 mm thick specimens ($\phi$=80 mm, d=6 mm).

TABLE 2

| | Aniline (mol) | Cyclohexylamine (mol) | Reaction time (h) | N content[1] (%) | AN (meq/g) | Transm. (%) | $Y_i$ | $T_g$ (°C.) |
|---|---|---|---|---|---|---|---|---|
| 11 (comp.) | 1.5 | — | 16 | 2.6 | 0.61 | 81 | 17.3 | 165 |
| 12 | 1.2 | 0.3 | 8 | 5.6 | 0.33 | 88 | 3.4 | 221 |
| 13 (comp.) | — | 1.5 | 8 | 5.8 | 0.35 | 90 | 2.0 | 211 |

[1]N content from elemental analysis

We claim:

1. In a process for enhancing the degree of imidization of polymers having an acid number ≦0.5 equivalents per kilogram of polymer, a transmissivity of ≧85% and a yellowness index of ≦15 and comprising essentially repeat units of the formula I

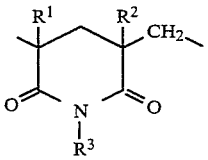

where

R$^1$ and R$^2$ are each hydrogen or methyl, and
R$^3$ is C$_6$–C$_{14}$-aryl, which may be monosubstituted, disubstituted or trisubstituted by radicals selected from the group consisting of C$_1$–C$_4$-alkyl, C$_1$–C$_4$-alkoxy and halogen, obtained by reacting a polymer based on C$_1$–C$_{20}$-alkyl esters of methacrylic acid or of acrylic acid or mixtures of such esters with an aromatic amine of the formula II

R$^3$NH$_2$     II, the improvement which comprises: carrying out the imidization reaction in the presence of an amine having a pK$_b$ value not greater than 9.

* * * * *